Patented Apr. 26, 1927.

1,626,167

UNITED STATES PATENT OFFICE.

FRITZ STRAUB, OF BASEL, SWITZERLAND, ASSIGNOR TO THE FIRM: SOCIETY OF CHEMICAL INDUSTRY IN BASLE, OF BASEL, SWITZERLAND.

DYESTUFFS CONTAINING CHROMIUM AND PROCESS OF MAKING THE SAME.

No Drawing. Application filed January 29, 1926, Serial No. 84,755, and in Switzerland February 14, 1925.

The present invention relates to new dyestuffs, it comprises the new products, the process of making the same, and the material dyed with the new dyestuffs.

It has been found that new dyestuffs containing chromium may be obtained by treating the dyestuffs made by coupling nitrated mononuclear o-hydroxy-diazo compounds with a-naphthylamine derivatives which combine in ortho-position to the amino group, with agents yielding chromium, such as for instance the derivatives of the trivalent chromium. The new dyestuffs corresponding with the general formula:

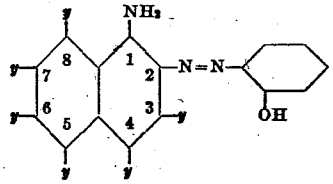

wherein the $y$'s stand for hydrogen atoms which are replaced at least once and at most thrice by sulfo groups which latter are not adjacent to each other and of which at least one is in 5, 4 or 3-position, and wherein the benzene nucleus contains at least one $NO_2$ group, form dark powders dissolving in water and dilute caustic soda solution with bluish-green to green, olive-green and dark-green coloration, yielding on wool, when dyed from an acid bath fast bluish-green, green, olive-green and blackish-green tints.

Example 1.

48.9 parts of the sodium salt of the dyestuff made from diazotized picramic acid and 1-naphthylamine-4-sulfonic acid corresponding with the formula:

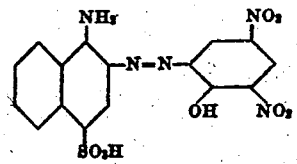

are dissolved in 900 parts of boiling water, 18 parts of chromium oxide $Cr_2O_3$ in form of a chromium fluoride solution of 4% strength are then added and the whole is boiled for some time after addition of glass powder in a reflux apparatus. The new dyestuff containing chromium is isolated by evaporating and salting out. It forms a blackish powder, soluble in water with dark green coloration not changing by addition of caustic soda and dyes wool from a sulfuric acid bath dark olive-green shades having excellent properties of fastness.

Similar dyestuffs are obtained with the azo dyestuffs from diazotized picramic acid and 1-naphthylamine-5-sulfonic acid or from diazotized 4-nitro-1-aminophenol and 1-naphthylamine-4-sulfonic acid.

Example 2.

50 parts of the dyestuff made from diazotized 5-nitro-2-amino-1-phenol and naphthionic acid corresponding with the formula:

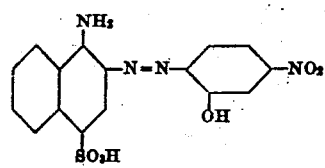

are dissolved in 500 parts of boiling water, 15.2 parts of chromium oxide in form of a chromium fluoride solution of 4% strength are then added and the whole is boiled for some time in a reflux apparatus after addition of glass powder. The new dyestuff containing chromium is isolated by evaporating and salting out. It forms a blackish powder, dissolving in water and in caustic soda solution of 10% strength with bluish-green coloration and dyes wool from a sulfuric acid bath bluish-green shades with excellent properties of fastness. The dyestuffs containing chromium obtained in the same manner from diazotized 5-nitro-2-amino-1-phenol and 1-naphthylamine-4,8-disulfonic acid shows similar properties.

Example 3.

50 parts of the dyestuff made from diazotized 5-nitro-2-amino-1-phenol and 1-naphthylamine-3,6-disulfonic acid corresponding with the formula:

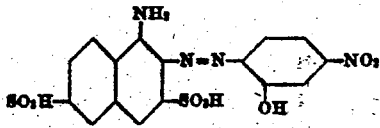

are dissolved in 1500 parts of boiling water, 15.2 parts of chromoxide $(Cr_2O_3)$ in form of solid chromium formate are added and the whole is boiled for some time in a reflux apparatus. The new dyestuff containing chromium is isolated by evaporating and salting out. It forms a blackish powder, dissolving in water with greenish, in caustic soda solution of 10% strength with olive-green coloration and dyes wool from a sulfuric acid bath green shades with excellent properties of fastness.

What I claim is:

1. A process for the production of azo dyestuffs containing chromium by treating the ortho-hydroxy-azo dyestuffs obtained by coupling nitrated mononuclear ortho-hydroxy-diazo compounds with α-naphthylamine derivatives which combine in ortho-position to the amino group, with derivatives of trivalent chromium.

2. A process for the production of azo dyestuffs containing chromium by treating the ortho-hydroxy-azo dyestuffs obtained by coupling nitrated mononuclear ortho-hydroxy-diazo compounds with 1-naphthylamine-4-sulfonic acid, with derivatives of trivalent chromium.

3. A process for the production of azo dyestuffs containing chromium by treating the ortho-hydroxy-azo dyestuffs obtained by coupling diazotized picramic acid with 1-naphthylamine-4-sulfonic acid, with derivatives of trivalent chromium.

4. As new products the herein described chromium derivatives of the ortho-hydroxy-azo dyestuffs corresponding with the general formula:

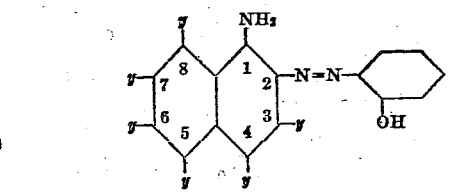

wherein the $y$'s stand for hydrogen atoms which are replaced at least once and at most thrice by sulfo groups, which latter are not adjacent to each other and of which at least one is in 5, 4 or 3-position, and wherein the benzene nucleus contains at least one $NO_2$ group, which products form dark powders dissolving in water and dilute caustic soda solution with bluish-green to green, olive-green and dark-green coloration, yielding on wool, when dyed from an acid bath fast bluish-green, green, olive-green and blackish-green tints.

5. As new products the herein described chromium derivatives of the ortho-hydroxy-azo dyestuffs corresponding with the formula:

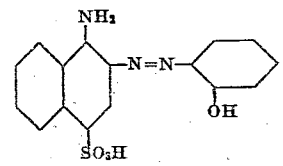

wherein the benzene nucleus contains at least one $NO_2$ group, which products form dark powders dissolving in water and dilute caustic soda solution with bluish-green to green, olive-green and dark-green coloration, yielding on wool, when dyed from an acid bath fast bluish-green, green, olive-green and blackish-green tints.

6. As new products the herein described chromium derivatives of the ortho-hydroxy-azo dyestuff corresponding with the formula:

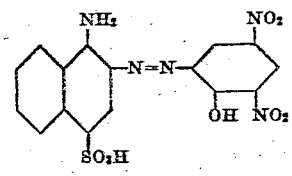

which product forms a blackish powder dissolving in water with dark-green coloration not changed by addition of caustic soda solution, dyeing wool from a sulfuric acid bath very fast dark-olive-green shades.

In witness whereof I have hereunto signed my name this 16th day of January 1926.

FRITZ STRAUB.